Patented May 27, 1941

2,243,278

UNITED STATES PATENT OFFICE 2,243,278

ALLOY FOR SOLDERING ALUMINUM

John Johnson, New York, N. Y.

No Drawing. Application November 9, 1940,
Serial No. 365,013

2 Claims. (Cl. 75—175)

This invention relates, generally, to alloys, and the invention has reference, more particularly, to a novel alloy which is especially useful for brazing or soldering together parts made of aluminum or aluminum alloys, the said soldering alloy comprising essentially a solidified solution of tin, cadmium, zinc, copper and silver.

Heretofore known alloys or solders of various composition, and specifically alloys of zinc, copper and silver, or zinc, cadmium, copper and silver, used for brazing or soldering aluminum and aluminum alloys have not proven entirely satisfactory due to the fact that they are not sufficiently easy flowing and consequently do not admit of application in relatively thin brazing coats. Furthermore, their capillary effect when in molten state is very limited, and their adherence to aluminum surfaces to be bonded is likely to be weak and uneven, tending to leave the bonding layer thereof rough or lumpy and consequently not uniformly distributed over and intimately united with the surfaces to be bonded.

The instant invention provides a novel alloy for brazing or soldering together parts made of aluminum or aluminum alloys which avoids the objections above referred to with respect to soldering alloys heretofore used for this purpose. To this end the instant invention has for an object to provide a novel soldering alloy comprising tin, cadmium, zinc, copper and silver so relatively proportioned that it will readily and smoothly flow at a comparatively low temperature range, e. g. from 350 to 550 degrees Fahrenheit; which in molten state will provide an extremely high capillary effect and capillary speed, whereby it is able to place and uninterruptedly spread itself between two adjacent very closely pressed together surfaces; which, due to its composition is very stable and resistant to deleterious effects of moisture and air, being substantially anti-corrosive; which leaves no slag or other undesirable residue after application; which affords a very strongly adherent bond or joint; and which forms a smooth surface after application, as well as one of very brilliant appearance and good color matching with reference to aluminum or aluminum alloys to which it is applied.

The novel alloy of this invention contains a major portion of tin which, as modified by relatively considerably smaller amounts of cadmium and zinc, and comparatively relatively much smaller amounts of copper and silver, produces an alloy of comparatively low melting point and free and smooth flowing characteristics, and yet of great bonding efficiency. The tin is tough and yet comparatively smooth flowing; the zinc and cadmium both reduce the melting point and enhance flowability, and yet are not present in sufficient amounts to result in brittleness or impairment of strength; the relatively small percentage of copper increases the affinity of the alloy for aluminum, enhances the smoothness with which the alloy flows and tends to strengthen the bond provided by the alloy; while the small percentage of silver further increases the bonding strength of the alloy and enhances its toughness or tensile strength. The range of these constituents of the novel soldering alloy is substantially as follows in the percentages given by weight:

| | Percent |
|---|---|
| Tin | 56 to 60 |
| Cadmium | 20 to 24 |
| Zinc | 14 to 16 |
| Copper | 1 to 5 |
| Silver | 2½ to 3 |

A specific formula for an alloy of this invention is given as follows:

| | Percent |
|---|---|
| Tin | 60 |
| Cadmium | 20 |
| Zinc | 15 |
| Copper | 2½ |
| Silver | 2½ |

The specific formula above recited provides a soldering alloy according to this invention which possesses a melting point operative between 325 to 400 degrees Fahrenheit, being preferably used at a temperature approximating 350 degrees Fahrenheit. The alloy of this specific formula may be very satisfactorily employed for brazing or soldering operations in connection with all types of aluminum, aluminum alloys and Duralumin.

The alloy of this invention may be modified to increase its melting point by somewhat decreasing its tin, zinc and copper content within the ranges specified in the general formula above given, while somewhat increasing its cadmium and silver content within said ranges; its operative melting point being raised to approximately 370 degrees Fahrenheit. As thus modified the soldering alloy is more especially adapted for brazing or soldering operations in connection with pure aluminum and soft aluminums or aluminum alloys. An illustrative formula thus modified would be as follows:

| | Percent |
|---|---|
| Tin | 58 |
| Cadmium | 24 |
| Zinc | 14 |
| Copper | 1 |
| Silver | 3 |

If a still higher melting point soldering alloy is desired, such as is more suitable for brazing or soldering operations in connection with hard aluminum alloys, such e. g. as Duralumin, magnesium aluminum alloys, or aluminum mixed with a small percentage of carbon, then the tin and cadmium content may be reduced to the minimum and the zinc, copper and silver increased to the maximum of the ranges given therefor in the above recited general formula; the formula so modified then being as follows:

| | Percent |
|---|---|
| Tin | 56 |
| Cadmium | 20 |
| Zinc | 16 |
| Copper | 5 |
| Silver | 3 |

The novel soldering alloy of this invention may be used without the employment of flux, and may be applied to the work by aid of any of the usual agencies for heating the solder and/or the surfaces to be joined, such e. g. as gas and air torches, blow torches, heated soldering irons, etc. A gas flame is probably the best agency for the work. It will be obvious that the novel soldering alloy of this invention may be employed for various kinds of original or repair work wherein aluminum parts are desired to be joined or bonded together. The soldering alloy may also be used for filling porous or pitted aluminum castings.

The soldering alloy of this invention may be wrought into suitable commercial shapes by casting, extruding, rolling, or hot or cold pressing as may be convenient in any given case.

What is claimed is:

1. An alloy of the character and for the purposes described which consists of tin from about 56 to 60%, cadmium from about 20 to 24%, zinc from about 14 to 16%, copper from about 1 to 5% and silver from about 2½ to 3%.

2. An alloy of the character and for the purposes described which consists of about 60% tin, about 20% cadmium, about 15% zinc, about 2½% copper, and about 2½% silver.

JOHN JOHNSON.